United States Patent [19]

Hayashi et al.

[11] Patent Number: 4,728,179
[45] Date of Patent: Mar. 1, 1988

[54] REAR CONVERSION LENS SYSTEM

[75] Inventors: Hikaru Hayashi, Nagano; Hiroshi Takase, Tokyo, both of Japan

[73] Assignee: Olympus Optical Co., Ltd., Tokyo, Japan

[21] Appl. No.: 742,522

[22] Filed: Jun. 7, 1985

[30] Foreign Application Priority Data

Jun. 8, 1984 [JP] Japan .................................. 59-116575

[51] Int. Cl.⁴ .............................................. G02B 9/60
[52] U.S. Cl. ...................................... 350/465; 350/422
[58] Field of Search ................ 350/422, 454, 455, 465

[56] References Cited

U.S. PATENT DOCUMENTS 4,206,971 6/1980 Hamanishi et al. ................ 350/422

FOREIGN PATENT DOCUMENTS 58-123515 7/1983 Japan ................................... 350/465

Primary Examiner—John K. Corbin
Assistant Examiner—P. M. Dzierzynski
Attorney, Agent, or Firm—Cushman, Darby & Cushman

[57] ABSTRACT

A rear conversion lens system to be used for varying the focal length being inserted to the space between an objective for a single-lens reflex camera and film surface, the rear conversion lens system comprising a first lens component arranged as a positive lens, a second lens component arranged as a negative lens, a third lens component arranged as a positive meniscus lens, a fourth lens component arranged as a biconcave lens, and a fifth lens component arranged as a positive cemented doublet, the rear conversion lens system being arranged that the magnification is higher than 1.6 and aberrations are corrected favorably.

7 Claims, 13 Drawing Figures

REAR CONVERSION LENS SYSTEM

BACKGROUND OF THE INVENTION (a) Field of the Invention

The present invention relates to a rear conversion lens system and, more particularly, to a rear conversion lens system for single-lens reflex cameras.

(b) Description of the Prior Art

The lens system disclosed in Japanese published unexamined patent application No. 123515/83 is known as a rear conversion lens system which resembles the rear conversion lens system accoridng to the present invention.

Figure 8A:
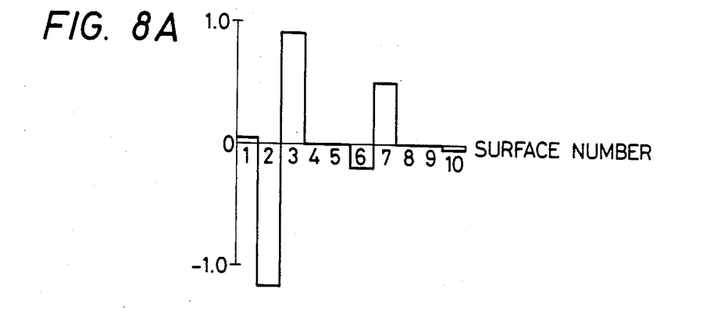
FIGS. 8A, 8B and 8C respectively show graphs illustrating distribution of aberration coefficients of spherical aberration on respective lens surfaces of the known rear conversion lens system.

Said known rear conversion lens system comprises a front lens group and a rear lens group wherein the front lens group comprises a first lens arranged as a positive lens, a second lens arranged as a negative lens and a third lens arranged as a positive lens, and the rear lens group comprises a fourth lens arranged as a negative lens and a fifth lens arranged as a positive lens or comprises a fourth lens arranged as a positive lens and a fifth lens arranged as a negative lens. Said known rear conversion system is arranged that the surface on the image side of the first lens has strong curvature. Therefore, spherical aberration of the third order is largely caused at the surface on the image side of the first lens (the second surface) as shown in FIG. 8A. To offset said spherical aberration, said known lens system is arranged that the surface on the object side of the second lens (the third surface) has strong curvature so that the aberration coefficient of spherical aberration of the third order becomes larger as shown in FIG. 8A.

Figure 8B:
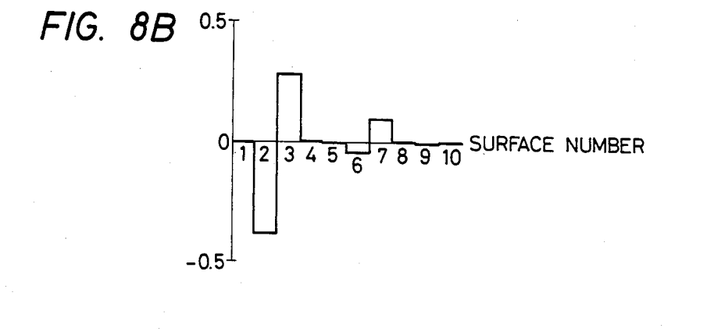
Figure 8C:
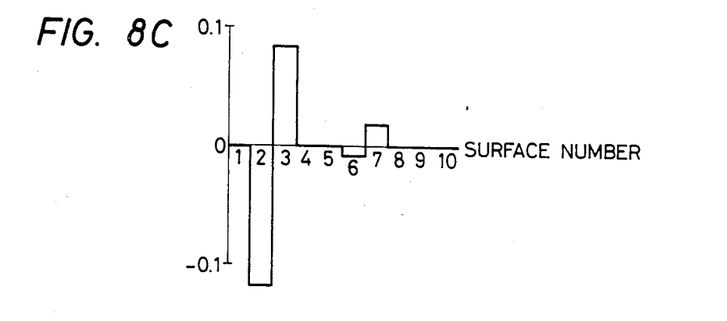

In case of said known lens system, the aberration coefficient of spherical aberration of the third order is large as described in the above and, therefore, the coefficients of spherical aberrations of the fifth and seventh orders are also large as shown in FIGS. 8B and 8C respectively.

As the magnification of said known lens system is 1.4, it is possible to control so that spherical aberrations of higher orders caused at certain surfaces are offset by spherical aberrations of higher orders caused at other surfaces. However, in case of a lens system with a magnification higher than 1.6 like the lens system to be provided by the present invention, it is difficult to arrange that spherical aberrations of higher orders caused at respective surfaces offset each other in the state that spherical aberrations caused by respective surfaces are left large.

SUMMARY OF THE INVENTION

It is, therefore, a primary object of the present invention to provide a rear conversion lens system to be used for varying the focal length by inserting said rear conversion lens system to the space between an objective for a single-lens reflex camera and film surface, said rear conversion lens system being arranged that the magnification is higher than 1.6 and aberrations are corrected favourably.

It is possible to correct spherical aberration of the third order in well balanced state without causing spherical aberration of higher order at respective lens surfaces in a lens system when lens components located in positions where heights of rays from the object point on the optical axis are high are arranged to have such shapes by which incident angles of rays do not become so large.

In case of a rear conversion lens system, incident heights of rays on lens components are higher for lens components located in positions in the lens system that are nearer the object side. Therefore, it is desirable to arrange that respective lens components constituting a front lens group thereof have such shapes that prevent spherical aberration of higher order from occurring. Besides, on respective lens components constituting the front lens group, incident heights of offaxial principal rays are comparatively low. Therefore, even when shapes of lens components are varied, influence on offaxial aberrations is small, and it is possible to correct spherical aberration without making offaxial aberrations unfavourable.

Figure 1:
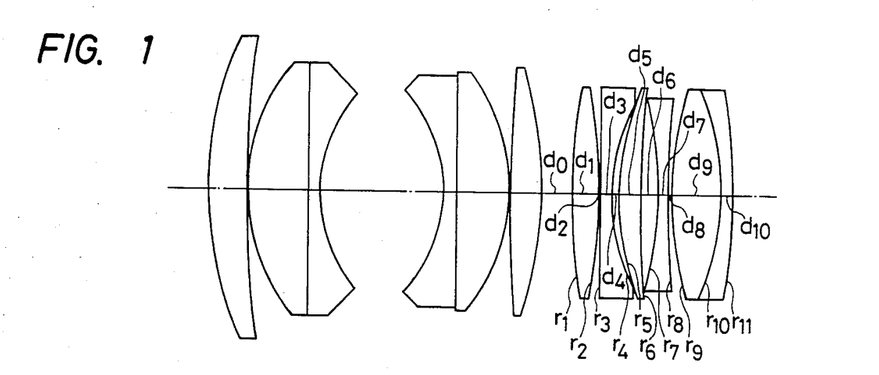
FIG. 1 shows a sectional view of Embodiment 1 of the rear conversion lens system according to the present invention shown in combination with a master lens system.
Figure 2:
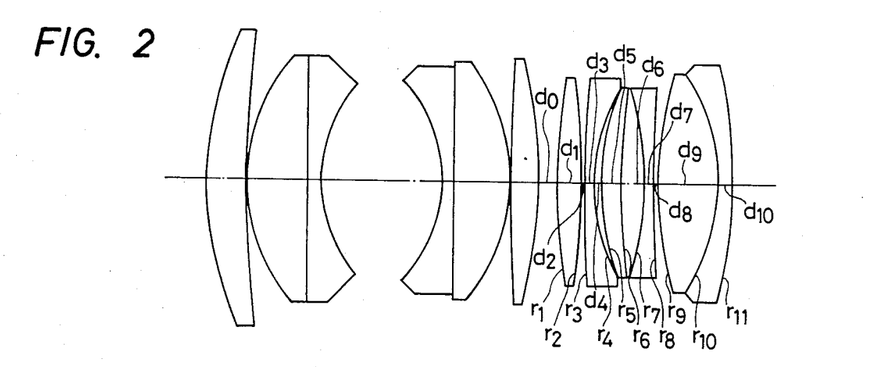
FIG. 2 shows a sectional view of Embodiments 2, 3 and 4 of the rear conversion lens system according to the present invention shown in combination with a master lens system.

The rear conversion lens system according to the present invention is arranged to have lens configurations as described below by taking the above-mentioned points into consideration. That is, as shown in FIGS. 1 and 2, the rear conversion lens system accroding to the present invention comprises, in the order from the object side, a front lens group and a rear lens group wherein said front lens group comprises a first lens component arranged as a biconvex lens, a second lens component arranged as a negative lens which has a surface with a small radius of curvature on the image side, and a third lens component arranged as a positive meniscus lens which is convex toward the object side, and said rear lens group comprises a fourth lens component arranged as a biconcave lens, and a fifth lens component arranged that the foremost surface thereof is convex toward the object side and the rearmost surface thereof is convex toward the image side and having positive refractive power. Besides, as rays from a master lens system that enter the rear conversion lens system are converging rays, the rear conversion lens system according to the present invention is arranged that the front lens group fulfills the conditions (1) and (2) shown below:

$$-0.2 < \frac{r_2 + r_1}{r_2 - r_1} < 0.2 \qquad (1)$$

$$-3.0 < \frac{r_6 + r_3}{r_6 - r_3} < -0.5 \qquad (2)$$

where, reference symbols $r_1$ and $r_2$ respectively represent radii of curvature of surfaces on the obejct side and on the image side of the first lens component, reference symbol $r_3$ represents the radius of curvature of the surface on the object side of the second lens component, and reference symbol $r_6$ represents the radius of curvature of the surface on the image side of the third lens component.

If the value defined by the condition (1) is made smaller than the lower limit thereof or the value defined by the condition (2) is made larger than the upper limit thereof, spherical aberration caused by the first lens component becomes large. If the value defined by the condition (1) is made larger than the upper limit thereof or the value defined by the condition (2) is made smaller than the lower limit thereof, offaxial aberrations become unfavorable.

Figure 9A:
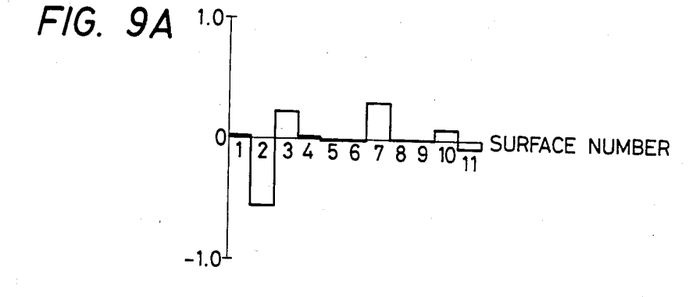
FIGS. 9A, 9B and 9C respectively show graphs illustrating distribution on aberration coefficients of spherical aberration on respective lens surfaces of Embodiment 4 of the present invention.
Figure 9B:
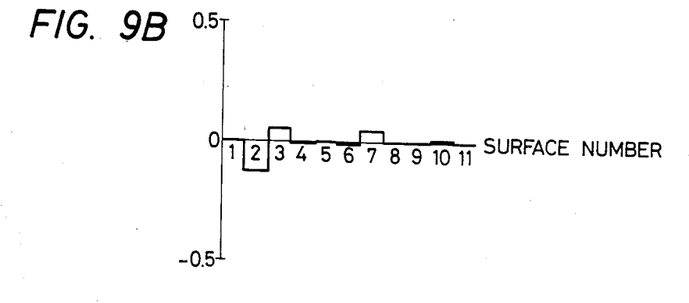
Figure 9C:
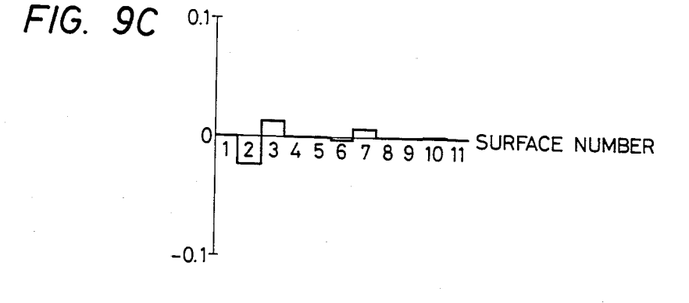

By fulfilling the conditions (1) and (2) shown in the above, the rear conversion lens system accoridng to the present invention is arranged that the aberration coefficients of spherical aberration are small as shown in FIGS. 9A, 9B and 9C. This will be evident when they are compared with the aberration coefficients of spherical aberration of the afore-mentioned known rear conversion lens system shown in FIGS. 8A, 8B and 8C.

In case of the afore-mentioned known rear conversion lens system, values corresponding to the condition (1) and (2) of the present invention are as shown below, and they do not fulfill the conditions (1) and (2).

$$\frac{r_2 + r_1}{r_2 - r_1} = -0.338, \frac{r_6 + r_3}{r_6 - r_3} = 2.491$$

Besides the conditions (1) and (2) shown in the above, it is preferable to arrange that the rear conversion lens system accroding to the present invention further fulfills the conditions (3), (4) and (5) shown below because it is then possible to obtain a more excellent rear conversion lens system.

$$-0.3 < \frac{f_R}{f_M} < 0.3 \quad (3)$$

$$0.3 < \frac{r_7}{f_R} < 0.6 \quad (4)$$

$$0.01 < \frac{d_6}{|f_R|} < 0.07 \quad (5)$$

where, reference symbol $f_M$ represents the focal length of the front lens group, reference symbol $f_R$ represents the focal length of the rear lens groups, reference symbol $r_7$ represents the radius of curvature of surface on the object side of the fourth lens component, and reference symbol $d_6$ represents the airspace between the front lens group and the rear lens group.

If the value defined by the condition (3) is made smaller than the lower limit thereof, the power of the rear lens group becomes too strong, and Petzval's sum becomes a negative value with a large absolute value. When the value defined by the condition (3) is made larger than the upper limit thereof, power distribution to the front lens group and the rear lens group will be balanced. However, the principal point on the image side of the rear conversion lens system largely shifts toward the object side and, therefore, it is impossible to make the back focal distance long.

If the value defined by the condition (4) is made smaller than the lower limit thereof, spherical aberration will be overcorrected. If the value defined by the condition (4) is made larger than the upper limit thereof, it is impossible to correct spherical aberration which is caused by the surface on the image side of the first lens component.

If the value defined by the condition (5) is made smaller than the lower limit thereof, heights of paraxial rays which enter the fourth lens component become high, and spherical aberration will be overcorrected. If the value defined by the condition (5) is made larger than the upper limit thereof, spherical aberration will be undercorrected.

DETAILED DESCRIPTION OF THE PREFERRED EMBODIMENTS

Now, the preferred embodiments of the rear conversion lens system according to the present invention are shown below.

Embodiment 1
$f_R = -70.00, f_M = 494.8$
$\beta = 1.6182, d_0 = 3.2334$

| | | | |
|---|---|---|---|
| $r_1 = 65.3150$ | | | |
| | $d_1 = 2.5000$ | $n_1 = 1.59270$ | $v_1 = 35.29$ |
| $r_2 = -56.3700$ | | | |
| | $d_2 = 0.1100$ | | |
| $r_3 = -1020.2860$ | | | |
| | $d_3 = 1.0000$ | $n_2 = 1.78800$ | $v_2 = 47.43$ |
| $r_4 = 22.3440$ | | | |
| | $d_4 = 0.8690$ | | |
| $r_5 = 27.0470$ | | | |
| | $d_5 = 2.5380$ | $n_3 = 1.59270$ | $v_3 = 35.29$ |
| $r_6 = 146.2040$ | | | |
| | $d_6 = 1.8460$ | | |
| $r_7 = -35.2670$ | | | |
| | $d_7 = 1.0000$ | $n_4 = 1.83481$ | $v_4 = 42.72$ |
| $r_8 = 112.2290$ | | | |
| | $d_8 = 0.1100$ | | |
| $r_9 = 36.8290$ | | | |
| | $d_9 = 5.6460$ | $n_5 = 1.54072$ | $v_5 = 47.20$ |
| $r_{10} = -22.1810$ | | | |
| | $d_{10} = 1.1740$ | $n_6 = 1.83481$ | $v_6 = 42.72$ |
| $r_{11} = -66.1630$ | | | |

$$\frac{r_2 + r_1}{r_2 - r_1} = -0.0735, \frac{r_6 + r_3}{r_6 - r_3} = -0.7493$$

$$\frac{f_R}{f_M} = -0.1415, \frac{r_7}{f_R} = 0.5038, \frac{d_6}{|f_R|} = 0.0264$$

Embodiment 2
$f_R = -71.26, f_M = -753.9$
$\beta = 1.6446, d_0 = 1.7334$

| | | | |
|---|---|---|---|
| $r_1 = 59.7100$ | | | |
| | $d_1 = 2.6550$ | $n_1 = 1.59270$ | $v_1 = 35.29$ |
| $r_2 = -70.6120$ | | | |
| | $d_2 = 0.3050$ | | |
| $r_3 = 230.2630$ | | | |
| | $d_3 = 1.0000$ | $n_2 = 1.78800$ | $v_2 = 47.43$ |
| $r_4 = 19.8380$ | | | |
| | $d_4 = 0.5000$ | | |
| $r_5 = 23.6030$ | | | |
| | $d_5 = 2.5770$ | $n_3 = 1.59270$ | $v_3 = 35.29$ |
| $r_6 = 63.6770$ | | | |
| | $d_6 = 2.5750$ | | |
| $r_7 = -32.9540$ | | | |
| | $d_7 = 1.0000$ | $n_4 = 1.83481$ | $v_4 = 42.72$ |
| $r_8 = 151.7740$ | | | |
| | $d_8 = 0.1500$ | | |
| $r_9 = 34.7750$ | | | |
| | $d_9 = 6.7160$ | $n_5 = 1.54072$ | $v_5 = 47.20$ |

-continued $r_{10} = -20.3070$
$r_{11} = -51.2550$
$d_{10} = 1.1000$  $n_6 = 1.83481$  $\nu_6 = 42.72$ $$\frac{r_2 + r_1}{r_2 - r_1} = 0.0837, \frac{r_6 + r_3}{r_6 - r_3} = -1.7645$$

$$\frac{f_R}{f_M} = 0.0945, \frac{r_7}{f_R} = 0.4625, \frac{d_6}{|f_R|} = 0.0361$$

Embodiment 3
$f_R = -79.35, f_M = -365.9$
$\beta = 1.6075, d_0 = 1.2334$

| | | | |
|---|---|---|---|
| $r_1 = 63.3860$ | $d_1 = 3.0400$ | $n_1 = 1.59270$ | $\nu_1 = 35.29$ |
| $r_2 = -67.3950$ | $d_2 = 0.2060$ | | |
| $r_3 = 200.2740$ | $d_3 = 1.0000$ | $n_2 = 1.77250$ | $\nu_2 = 49.66$ |
| $r_4 = 19.2030$ | $d_4 = 0.3670$ | | |
| $r_5 = 21.8630$ | $d_5 = 2.6540$ | $n_3 = 1.59270$ | $\nu_3 = 35.29$ |
| $r_6 = 47.3040$ | $d_6 = 3.3890$ | | |
| $r_7 = -26.8450$ | $d_7 = 1.0000$ | $n_4 = 1.83481$ | $\nu_4 = 42.72$ |
| $r_8 = 1566.7150$ | $d_8 = 0.1500$ | | |
| $r_9 = 38.8710$ | $d_9 = 7.1630$ | $n_5 = 1.53172$ | $\nu_5 = 48.90$ |
| $r_{10} = -19.2180$ | $d_{10} = 1.3000$ | $n_6 = 1.80440$ | $\nu_6 = 39.58$ |
| $r_{11} = -39.5370$ | | | |

$$\frac{r_2 + r_1}{r_2 - r_1} = 0.0307, \frac{r_6 + r_3}{r_6 - r_3} = -1.6185$$

$$\frac{f_R}{f_M} = 0.2169, \frac{r_7}{f_R} = 0.3383, \frac{d_6}{|f_R|} = 0.0427$$

Embodiment 4
$f_R = -72.62, f_M = -952.4$
$\beta = 1.6437, d_0 = 1.2334$

| | | | |
|---|---|---|---|
| $r_1 = 73.4560$ | $d_1 = 2.7500$ | $n_1 = 1.59270$ | $\nu_1 = 35.29$ |
| $r_2 = -70.0090$ | $d_2 = 0.2200$ | | |
| $r_3 = 161.2070$ | $d_3 = 1.0000$ | $n_2 = 1.78800$ | $\nu_2 = 47.43$ |
| $r_4 = 19.7150$ | $d_4 = 0.3400$ | | |
| $r_5 = 22.3830$ | $d_5 = 2.6600$ | $n_3 = 1.59270$ | $\nu_3 = 35.29$ |
| $r_6 = 61.1290$ | $d_6 = 3.1200$ | | |
| $r_7 = -31.9280$ | $d_7 = 1.0000$ | $n_4 = 1.83481$ | $\nu_4 = 42.72$ |
| $r_8 = 157.7970$ | $d_8 = 0.1200$ | | |
| $r_9 = 36.5970$ | $d_9 = 6.4300$ | $n_5 = 1.54072$ | $\nu_5 = 47.20$ |
| $r_{10} = -21.0120$ | $d_{10} = 1.3000$ | $n_6 = 1.83481$ | $\nu_6 = 42.72$ |
| $r_{11} = -50.1130$ | | | |

$$\frac{r_2 + r_1}{r_2 - r_1} = -0.0240, \frac{r_6 + r_3}{r_6 - r_3} = -2.2216$$

$$\frac{f_R}{f_M} = 0.0762, \frac{r_7}{f_R} = 0.4390, \frac{d_6}{|f_R|} = 0.0429$$

In the embodiments shown in the above, reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

Out of respective embodiments shown in the above, Embodiment 1 has the lens configuration as shown in FIG. 1 in which the second lens component in the front lens group is arranged as a biconcave lens, and the fifth lens component in the rear lens group is arranged as a positive cemented doublet with consists of a positive lens element and a negative lens element. Embodiments 2, 3 and 4 respectively have the lens configuration as shown in FIG. 2 in which the second lens component in the front lens group is arranged as a negative meniscus lens, and the fifth lens component in the rear lens group is arranged as a positive cemented doublet which consists of a positive lens element and a negative lens element.

Figure 3:
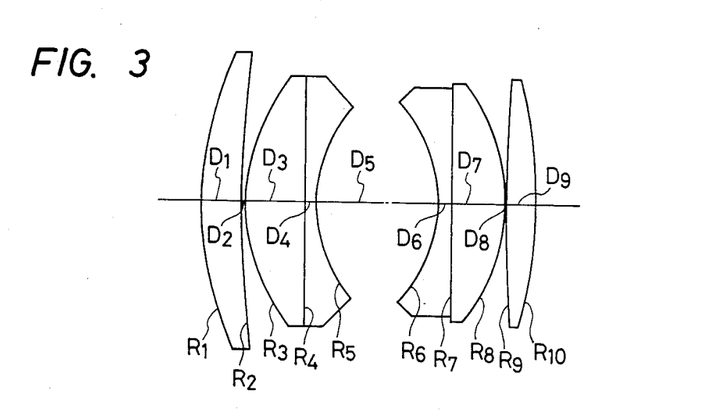
FIG. 3 shows a sectional view of an example of master lens systems to be used in combination with the rear conversion lens systems according to the present invention.
Figure 4:
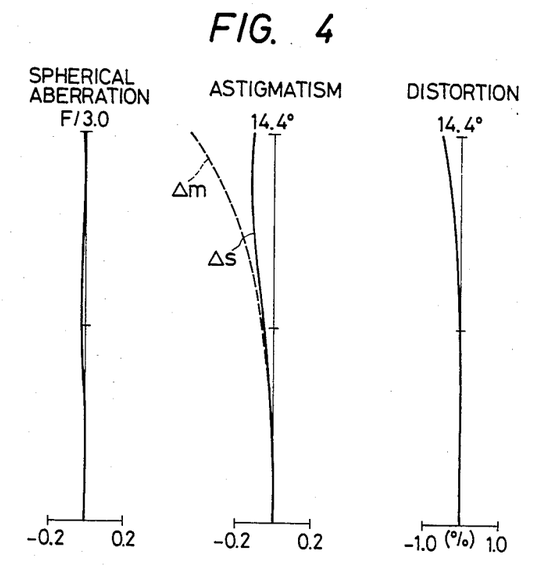
FIGS. 4 through 7 respectively show graphs illustrating aberration curves of Embodiments 1 through 4 of the present invention.
Figure 5:
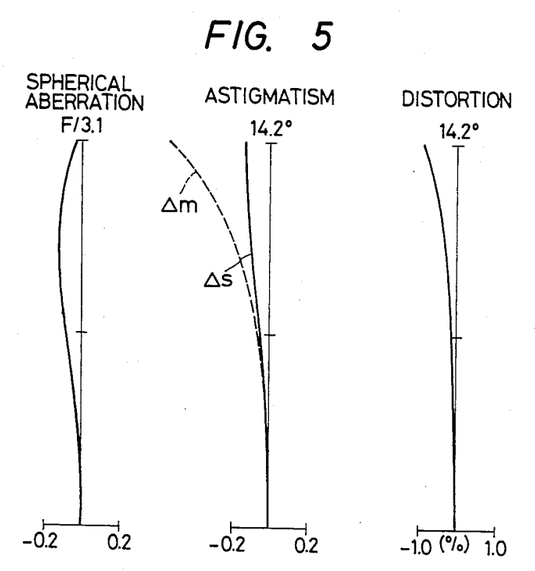
Figure 6:
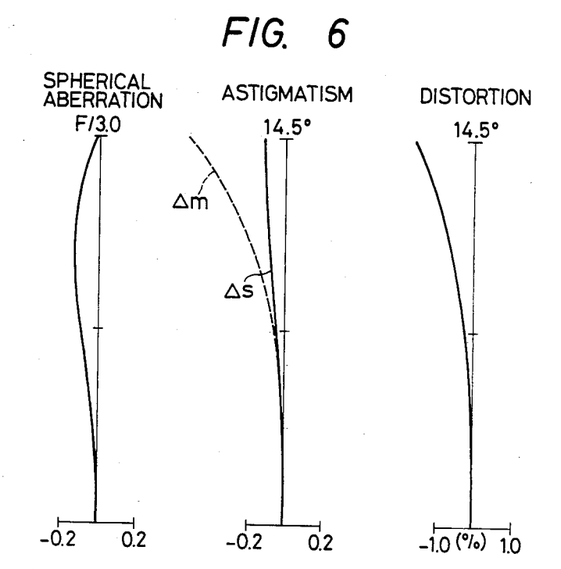
Figure 7:
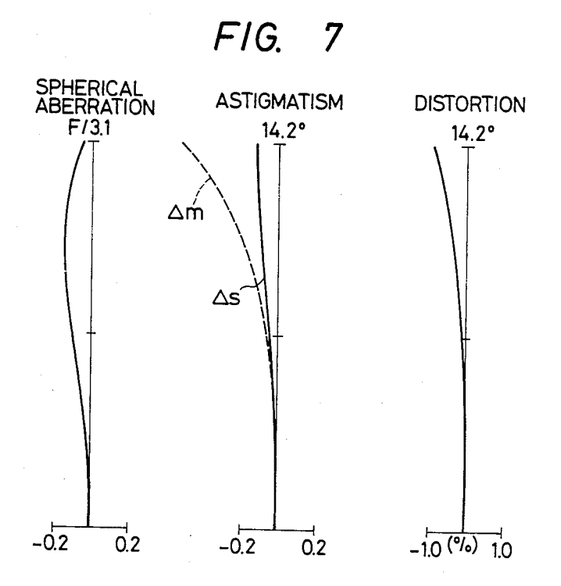

The lens system according to said embodiments are used being arranged in rear of a master lens system which is composed, for example, as shown in FIG. 3 and has the numerical data as shown below.

$f = 51.84, F/1.86$

| | | | |
|---|---|---|---|
| $R_1 = 33.79$ | $D_1 = 4.5$ | $N_1 = 1.78472$ | $V_1 = 25.68$ |
| $R_2 = 130.283$ | $D_2 = 0.15$ | | |
| $R_3 = 21.458$ | $D_3 = 6.59$ | $N_2 = 1.60311$ | $V_2 = 60.7$ |
| $R_4 = 349.306$ | $D_4 = 1.3$ | $N_3 = 1.78472$ | $V_3 = 25.71$ |
| $R_5 = 14.989$ | $D_5 = 13.0$ | | |
| $R_6 = -15.134$ | $D_6 = 1.65$ | $N_4 = 1.72825$ | $V_4 = 28.46$ |
| $R_7 = -490.538$ | $D_7 = 5.6$ | $N_5 = 1.80610$ | $V_5 = 40.95$ |
| $R_8 = -20.316$ | $D_8 = 0.15$ | | |
| $R_9 = 246.577$ | $D_9 = 3.23$ | $N_6 = 1.80610$ | $V_6 = 40.95$ |
| $R_{10} = -48.685$ | | | |

In the numerical data shown in the above, reference symobls $R_1$ through $R_{10}$ respectively represent radii of curvature of respective lens surfaces, reference symbols $D_1$ through $D_9$ respectively represent thicknesses of respective lenses and airspaces between respective lenses, reference symbols $N_1$ through $N_6$ respectively represent refractive indices of respective lenses, and reference symbols $V_1$ through $V_6$ respectively represent Abbe's numbers of respective lenses.

The rear conversion lens system according to the present invention described so far has the lens composition as explained before and is arranged that, by fulfilling the conditions (1) and (2), the aberration coefficients of spherical aberration of the third order, aberration coefficients of spherical aberration of the fifth order, and aberration coefficients of spherical aberration of the seventh order on respective lens surfaces are made small as shown in FIGS. 9A, 9B and 9C, and the magnification of the lens system is made high, i.e., higher than 1.6.

We claim:

1. A rear conversion lens system comprising a front lens group and a rear lens group in the order from the object side and said front lens groups comprising a first lens component arranged as a biconvex lens, a second lens component arranged as a negative lens having a surface with a small radius of curvature on the image side, and a third lens component arranged as a positive meniscus lens convex toward the object side, and said rear lens group comprising a fourth lens component arranged as a biconcave lens, and a fifth lens component arranged as a positive lens component formed that the foremost surface thereof is convex toward the object side and the rearmost surface thereof is convex toward the image side, said rear conversion lens system having a magnification higher than 1.6 and fulfilling the conditions (1) and (2) shown below:

$$-0.2 < \frac{r_2 + r_1}{r_2 - r_1} < 0.2 \quad (1)$$

$$-3.0 < \frac{r_6 + r_3}{r_6 - r_3} < -0.5 \quad (2)$$

where, reference symbols $r_1$ and $r_2$ respectively represent radii of curvature of the surfaces on the object side and on the image side of the first lens component, reference symbol $r_3$ represents the radius of curvature of the surface on the object side of the second lens component, and reference symbol $r_6$ represents the radius of curvature of the surface on the image side of the third lens component.

2. A rear conversion lens system according to claim 1 further fulfilling the conditions (3), (4) and (5) shown below:

$$-0.3 < \frac{f_R}{f_M} < 0.3 \quad (3)$$

$$0.3 < \frac{r_7}{f_R} < 0.6 \quad (4)$$

$$0.01 < \frac{d_6}{|f_R|} < 0.07 \quad (5)$$

where, reference symbol $f_M$ represents the focal length of the front lens group, reference symbol $f_R$ represents the focal length of the rear lens group, reference symbol $r_7$ represents the radius of curvature of the surface on the object side of the fourth lens component, and reference symbol $d_6$ represents the airspace between the front lens group and the rear lens group.

3. A rear conversion lens system according to claim 2 wherein said fifth lens component is arranged as a positive cemented doublet consisting of a positive lens element and a negative lens element.

4. A rear conversion lens system according to claim 3 wherein said second lens component is arranged as a biconcave lens and said rear conversion lens system has the following numerical data:

| $f_R = -70.00, f_M = 494.8$ |
| :--- |
| $\beta = 1.6182, d_0 = 3.2334$ |

| | | | |
| :--- | :--- | :--- | :--- |
| $r_1 = 65.3150$ | | | |
| | $d_1 = 2.5000$ | $n_1 = 1.59270$ | $\nu_1 = 35.29$ |
| $r_2 = -56.3700$ | | | |
| | $d_2 = 0.1100$ | | |
| $r_3 = -1020.2860$ | | | |
| | $d_3 = 1.0000$ | $n_2 = 1.78800$ | $\nu_2 = 47.43$ |
| $r_4 = 22.3440$ | | | |
| | $d_4 = 0.8690$ | | |
| $r_5 = 27.0470$ | | | |
| | $d_5 = 2.5380$ | $n_3 = 1.59270$ | $\nu_3 = 35.29$ |
| $r_6 = 146.2040$ | | | |
| | $d_6 = 1.8460$ | | |
| $r_7 = -35.2670$ | | | |
| | $d_7 = 1.0000$ | $n_4 = 1.83481$ | $\nu_4 = 42.72$ |

-continued

| $f_R = -70.00, f_M = 494.8$ |
| :--- |
| $\beta = 1.6182, d_0 = 3.2334$ |

| | | | |
| :--- | :--- | :--- | :--- |
| $r_8 = 112.2290$ | | | |
| | $d_8 = 0.1100$ | | |
| $r_9 = 36.8290$ | | | |
| | $d_9 = 5.6460$ | $n_5 = 1.54072$ | $\nu_5 = 47.20$ |
| $r_{10} = -22.1810$ | | | |
| | $d_{10} = 1.1740$ | $n_6 = 1.83481$ | $\nu_6 = 42.72$ |
| $r_{11} = -66.1630$ | | | |

$$\frac{r_2 + r_1}{r_2 - r_1} = -0.0735, \frac{r_6 + r_3}{r_6 - r_3} = -0.7493$$

$$\frac{f_R}{f_M} = -0.1415, \frac{r_7}{f_R} = 0.5038, \frac{d_6}{|f_R|} = 0.0264$$

where, reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively respresent Abbe's numbers of respective lenses.

5. A rear conversion lens system according to claim 3 wherein said second lens component is arranged as a negative meniscus lens convex toward the object side and said rear conversion lens system has the following numerical data:

| $f_R = -71.26, f_M = -753.9$ |
| :--- |
| $\beta = 1.6446, d_0 = 1.7334$ |

| | | | |
| :--- | :--- | :--- | :--- |
| $r_1 = 59.7100$ | | | |
| | $d_1 = 2.6550$ | $n_1 = 1.59270$ | $\nu_1 = 35.29$ |
| $r_2 = -70.6120$ | | | |
| | $d_2 = 0.3050$ | | |
| $r_3 = 230.2630$ | | | |
| | $d_3 = 1.0000$ | $n_2 = 1.78800$ | $\nu_2 = 47.43$ |
| $r_4 = 19.8380$ | | | |
| | $d_4 = 0.5000$ | | |
| $r_5 = 23.6030$ | | | |
| | $d_5 = 2.5770$ | $n_3 = 1.59270$ | $\nu_3 = 35.29$ |
| $r_6 = 63.6770$ | | | |
| | $d_6 = 2.5750$ | | |
| $r_7 = -32.9540$ | | | |
| | $d_7 = 1.0000$ | $n_4 = 1.83481$ | $\nu_4 = 42.72$ |
| $r_8 = 141.7740$ | | | |
| | $d_8 = 0.1500$ | | |
| $r_9 = 34.7750$ | | | |
| | $d_9 = 6.7160$ | $n_5 = 1.54072$ | $\nu_5 = 47.20$ |
| $r_{10} = -20.3070$ | | | |
| | $d_{10} = 1.1000$ | $n_6 = 1.83481$ | $\nu_6 = 42.72$ |
| $r_{11} = -51.2550$ | | | |

$$\frac{r_2 + r_1}{r_2 - r_1} = 0.0837, \frac{r_6 + r_3}{r_6 - r_3} = -1.7645$$

$$\frac{f_R}{f_M} = 0.0945, \frac{r_7}{f_R} = 0.4625, \frac{d_6}{|f_R|} = 0.0361$$

where, reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

6. A rear conversion lens system according to claim 3 wherein said second lens component is arranged as a negative meniscus lens convex toward the object side and said rear conversion lens system has the following numerical data:

| $f_R = -79.35$, $f_M = -365.9$ $\beta = 1.6075$, $d_0 = 1.2334$ | | | |
|---|---|---|---|
| $r_1 = 63.3860$ | | | |
| | $d_1 = 3.0400$ | $n_1 = 1.59270$ | $\nu_1 = 35.29$ |
| $r_2 = -67.3950$ | | | |
| | $d_2 = 0.2060$ | | |
| $r_3 = 200.2740$ | | | |
| | $d_3 = 1.0000$ | $n_2 = 1.77250$ | $\nu_2 = 49.66$ |
| $r_4 = 19.2030$ | | | |
| | $d_4 = 0.3670$ | | |
| $r_5 = 21.8630$ | | | |
| | $d_5 = 2.6540$ | $n_3 = 1.59270$ | $\nu_3 = 35.29$ |
| $r_6 = 47.3040$ | | | |
| | $d_6 = 3.3890$ | | |
| $r_7 = -26.8450$ | | | |
| | $d_7 = 1.0000$ | $n_4 = 1.83481$ | $\nu_4 = 42.72$ |
| $r_8 = 1566.7150$ | | | |
| | $d_8 = 0.1500$ | | |
| $r_9 = 38.8710$ | | | |
| | $d_9 = 7.1630$ | $n_5 = 1.53172$ | $\nu_5 = 48.90$ |
| $r_{10} = -19.2180$ | | | |
| | $d_{10} = 1.3000$ | $n_6 = 1.80440$ | $\nu_6 = 39.58$ |
| $r_{11} = -39.5370$ | | | |

$$\frac{r_2 + r_1}{r_2 - r_1} = 0.0307, \frac{r_6 + r_3}{r_6 - r_3} = -1.6185$$

$$\frac{f_R}{f_M} = 0.2169, \frac{r_7}{f_R} = 0.3383, \frac{d_6}{|f_R|} = 0.0427$$

where, reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

7. A rear conversion lens system according to claim 3 wherein said second lens component is arranged as a negative meniscus lens convex toward the object side and said rear conversion lens system has the following numerical data:

| $f_R = -72.62$, $f_M = -952.4$ $\beta = 1.6437$, $d_0 = 1.2334$ | | | |
|---|---|---|---|
| $r_1 = 73.4560$ | | | |
| | $d_1 = 2.7500$ | $n_1 = 1.59270$ | $\nu_1 = 35.29$ |
| $r_2 = -70.0090$ | | | |
| | $d_2 = 0.2200$ | | |
| $r_3 = 161.2070$ | | | |
| | $d_3 = 1.0000$ | $n_2 = 1.78800$ | $\nu_2 = 47.43$ |
| $r_4 = 19.7150$ | | | |
| | $d_4 = 0.3400$ | | |
| $r_5 = 22.3830$ | | | |
| | $d_5 = 2.6600$ | $n_3 = 1.59270$ | $\nu_3 = 35.29$ |
| $r_6 = 61.1290$ | | | |
| | $d_6 = 3.1200$ | | |
| $r_7 = -31.9280$ | | | |
| | $d_7 = 1.0000$ | $n_4 = 1.83481$ | $\nu_4 = 42.72$ |
| $r_8 = 157.7970$ | | | |
| | $d_8 = 0.1200$ | | |
| $r_9 = 36.5970$ | | | |
| | $d_9 = 6.4300$ | $n_5 = 1.54072$ | $\nu_5 = 47.20$ |
| $r_{10} = -21.0120$ | | | |
| | $d_{10} = 1.3000$ | $n_6 = 1.83481$ | $\nu_6 = 42.72$ |
| $r_{11} = -50.1130$ | | | |

$$\frac{r_2 + r_1}{r_2 - r_1} = -0.0240, \frac{r_6 + r_3}{r_6 - r_3} = -2.2216$$

$$\frac{f_R}{f_M} = 0.0762, \frac{r_7}{f_R} = 0.4390, \frac{d_6}{|f_R|} = 0.0429$$

where, reference symbols $r_1$ through $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

* * * * *